US008732406B1

(12) United States Patent
Pase et al.

(10) Patent No.: US 8,732,406 B1
(45) Date of Patent: May 20, 2014

(54) MECHANISM FOR DETERMINING READ-AHEAD LENGTH IN A STORAGE SYSTEM

(75) Inventors: Douglas Michael Pase, Raleigh, NC (US); Rickard Faith, Hillsborough, NC (US); Matti Vanninen, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 524 days.

(21) Appl. No.: 13/048,486

(22) Filed: Mar. 15, 2011

(51) Int. Cl.
*G06F 12/08* (2006.01)

(52) U.S. Cl.
CPC ........ *G06F 12/0862* (2013.01); *G06F 12/0866* (2013.01)
USPC .......................................... 711/137; 711/113

(58) Field of Classification Search
USPC ....................................................... 711/137
See application file for complete search history.

(56) References Cited

U.S. PATENT DOCUMENTS

| | | | |
|---|---|---|---|
| 6,721,870 B1 * | 4/2004 | Yochai et al. ................. | 711/204 |
| 7,392,340 B1 * | 6/2008 | Dang et al. .................... | 711/111 |
| 7,631,148 B2 | 12/2009 | Fair | |
| 7,856,533 B2 * | 12/2010 | Hur et al. ....................... | 711/137 |
| 2002/0174293 A1 * | 11/2002 | Fox et al. ....................... | 711/111 |
| 2003/0217230 A1 * | 11/2003 | Rodriguez et al. ............ | 711/136 |
| 2005/0154825 A1 * | 7/2005 | Fair ................................ | 711/113 |
| 2005/0251630 A1 * | 11/2005 | Matthews et al. ............. | 711/138 |
| 2007/0106849 A1 * | 5/2007 | Moore et al. .................. | 711/137 |
| 2008/0005480 A1 * | 1/2008 | Lubbers et al. ............... | 711/137 |
| 2008/0133872 A1 * | 6/2008 | Fair ............................... | 711/204 |
| 2012/0054449 A1 * | 3/2012 | Hu et al. ....................... | 711/137 |

OTHER PUBLICATIONS

"Measuring file access patterns in UNIX" by Irene Hu, ACM SIGMETRICS, vol. 1 14, issue, Aug. 2, 1986; pp. 15-20.*

* cited by examiner

*Primary Examiner* — Kaushikkumar Patel
(74) *Attorney, Agent, or Firm* — Cooper Legal Group, LLC

(57) ABSTRACT

A storage system tracks statistical behavior of client read requests directed to a storage device to form prediction about data that the client will require next. The storage system collects the size of read sequences for various streams into a data structure, which summarizes past behavior of read requests. This data structure reports the number of streams in each equivalence class of stream sizes that is tracked. The data structure is then used to determine expected size of a selected read stream. The data structure is also used to improve predictions about an expected size computed by a known technique.

18 Claims, 13 Drawing Sheets

READ SET 420

| | |
|---|---|
| NEXT POINTER | 902 |
| LEVEL | 904 |
| COUNT | 906 |
| LAST READ OFFSET | 908 |
| LAST READ SIZE | 910 |
| NEXT READ-AHEAD | 912 |
| READ-AHEAD SIZE | 914 |
| FLAGS | 916 |

FIG. 4b

MECHANISM FOR DETERMINING READ-AHEAD LENGTH IN A STORAGE SYSTEM

RELATED APPLICATIONS

This application is related to U.S. Pat. No. 7,631,148, commonly assigned to NetApp, Inc., entitled ADAPTIVE FILE READ-AHEAD TECHNIQUE FOR MULTIPLE READ STREAMS, by Robert L. Fair, the teachings of which are expressly incorporated herein by reference.

FIELD OF THE INVENTION

The inventive techniques described herein relate to storage systems and, more specifically, to a novel mechanism for a storage system to determine length of read-ahead operations for read streams.

BACKGROUND OF THE INVENTION

A storage system provides storage service relating to the organization of information on storage devices. The storage system may be configured to operate according to a client-server model of information delivery to allow many client systems to access shared resources, such as data containers, stored on the storage system. An application may reside on a client system connected over a network to a storage system, such as a controller provided by NetApp, Inc., of Sunnyvale, Calif., or it may reside on the storage system itself. In either implementation, the application sends requests for data to the storage system and the requested data are returned to the application by the storage system.

The storage system may retrieve the requested data from the storage device or from a memory, if the requested data are in the memory. Retrieving data from the memory is faster than retrieving data from the storage device, such as a disk. However, since the memory has size limitations, the storage system predicts what data might be needed before the request is made in order to have the data in the memory when the request arrives. The storage system may employ speculative read-ahead operations to retrieve data blocks that are likely to be requested by future client read requests. These "read-ahead" blocks are typically retrieved from a storage device and stored in memory (i.e., buffer cache) in the storage system, where each read-ahead data block is associated with a unique block number.

Read-ahead techniques are known to "prefetch" a predetermined number of data blocks that logically extend the read stream. For instance, when a client's read request retrieves a sequence of data blocks assigned to consecutively numbered block numbers, a read-ahead operation may be invoked to retrieve additional data blocks assigned to block numbers that further extend the sequence, even though these additional read-ahead blocks have not yet been requested by the client. Typically, the read-ahead operations are "triggered" when a read stream is detected to have done multiple sequential read operations. For example, suppose a read stream read block number 1, 2, 3, and 4 in one read operation, and then, sometime later, reads blocks 5, 6, 7, and 8. A read-ahead engine might predict that the next read operation will be for blocks 9, 10, 11, and 12, instructing the storage system to retrieve blocks 5 through 12.

While known read-ahead techniques work well in certain situations, they occasionally suffer from disadvantages. For example, some of read-ahead algorithms assume that the read stream length will be short, at least until proven otherwise. This causes the algorithms to undershoot, that is, to behave as if the stream is smaller than it actually is and does not predict data that could be profitably read. Also, known algorithms may request large amounts of data on the assumption that the read requests will always be sequential. This causes the algorithms to overshoot, i.e., to predict that the stream will be larger than it actually is, thereby causing the system to read a relatively large fixed number of read-ahead data blocks. The overshooting, in turn, consumes an excessive amount of buffer memory in the storage system. The resulting excessive memory usage, or "cache pollution," may cause the storage system to consume memory and resources that are needed for other system operations, and consequently may negatively impact the system's performance. For example, such cache pollution may increase the latency of data retrieval from the buffer memory since the storage system has to search a large number of "in-core" buffers containing read-ahead data. Furthermore, the risk of prefetching too much data may cause other data, which is more valuable than the prefetched data, to be evicted from the cache.

Accordingly, what is needed is a technique for optimizing prefetching of read-ahead data blocks in the storage system.

SUMMARY OF THE INVENTION

Embodiments described herein provide a system, method, and computer program product for optimizing the amount of data that need to be speculatively read ahead in a storage system in order to efficiently serve future client requests. The novel optimized technique studies past behavior of client read requests directed to a storage system (or subsystem) and uses the past behavior to predict the system's performance with respect to the future read requests. Throughout this description, the term "prediction" is used in its colloquial sense of "declaring in advance" or "making an inference regarding a future event based on probability theory." A "read stream" as used herein is an incoming read request to a storage device that requests sequential data blocks.

The inventive technique uses the past behavior of the multiple read streams to determine expected size of a selected read stream. According to one aspect of the invention, the storage system monitors client read requests in order to form prediction of what data a client will request next. To this end, the inventive technique collects the size of read sequences for various read streams into a read streams data structure, such as a histogram, which summarizes past behavior of the read streams. Histogram entries reflect the count of read streams having a certain size or that fall within a range of size. The size of each existing read stream is reflected in an entry of the histogram. As a new read request arrives for an existing stream, the size of the stream is updated in the read streams data structure (such as a histogram). The read streams data structure is then used to select a read stream based on various factors. The inventive techniques use the read streams data structure to compute expected size of the selected read stream and to speculatively read ahead a number of data blocks which represent difference between the expected size and the given size of the selected read stream.

According to another embodiment, the inventive techniques use the computed read streams data structure to determine probability if the selected read stream reaches expected size (which, for example, was computed using a known technique). The probabilities are compared to a predetermined threshold to decide whether the expected size should be used as an indication of how many data blocks the storage system should read ahead into its memory. The assessed probability allows the system to make a better prediction with respect to a size of a read ahead operation, thereby reducing the undesirable impact of reading ahead by the storage system too many or too few data blocks.

The storage system executes a number of engines to implement inventive techniques described herein. For example, a read stream monitoring engine is adapted to monitor read requests received by the storage system and to generate a read streams data structure reflecting past behavior of the read streams. A read-ahead length computing engine is configured to determine a read-ahead size of a read stream. A probability computing engine is responsible for computing probability that a selected read stream achieves a given length. The read-ahead engine is configured to speculatively read data into memory.

BRIEF DESCRIPTION OF THE DRAWINGS

The above and further advantages of the invention may be better understood by referring to the following description in conjunction with the accompanying drawings in which like reference numerals indicate identically or functionally similar elements:

FIG. 4B is a schematic block diagram of an illustrative read set data structure that advantageously may be employed in accordance with the present invention;

DETAILED DESCRIPTION OF ILLUSTRATIVE EMBODIMENTS

Storage System

Figure 1:
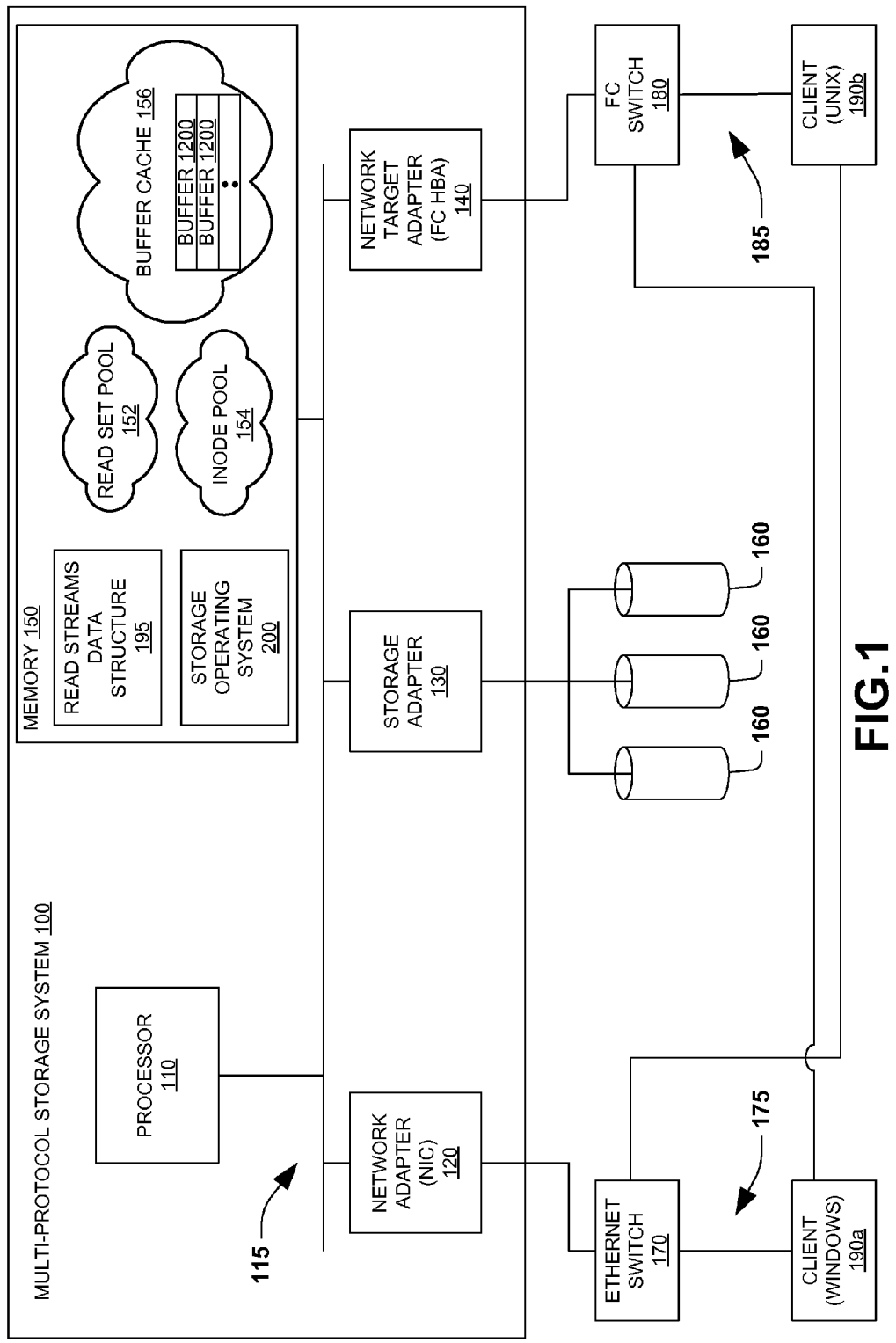
FIG. 1 is a schematic block diagram of an illustrative storage system environment that may be employed in accordance with the present invention.

FIG. 1 is a schematic block diagram of the multiprotocol storage system 100 configured to provide storage service relating to the organization of information on storage devices, such as disks 160. The storage system includes a storage operating system that logically organizes the information as a set of data blocks stored on the disks. The storage system supports both file-based requests to access data and block-based requests.

The storage devices may be arranged in various configurations, such as a redundant array of independent disks (RAID). The storage system 100 comprises a processor 110, a memory 150, a plurality of network adapters 120, 140 and a storage adapter 130 interconnected by a system bus 115. Those skilled in the art would understand that although in one implementation data can be stored on disks, other random access storage devices, such as flash, CD, or DVD drives can be used for storing data.

In the illustrative embodiment, the memory 150 comprises storage locations that are addressable by the processor 110 and adapters 120, 140 for storing software program code and data structures associated with the present invention. Portions of the memory may be organized as an inode "pool" 154 containing one or more inode data structures and a read set pool 152 containing read set data structures. Another portion of the memory may be further organized as a buffer cache 156 containing data buffers 1200. The processor and adapters may comprise processing elements and/or logic circuitry configured to execute the software code and manipulate the data structures stored in the memory 150. A storage operating system 200, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the inventive system and method described herein. The storage operating system can be implemented as a microkernel, like the Data ONTAP™ operating system available from NetApp, Inc., Sunnyvale, Calif. The storage operating system can also be implemented as an application program operating over a general-purpose operating system, such as UNIX® or Windows NT®, or as a general-purpose operating system with configurable functionality, which is configured for storage applications as described herein. It is expressly contemplated that any appropriate storage operating system may be enhanced for use in accordance with the inventive principles described herein.

To facilitate access to the storage devices 160, the storage operating system 200 implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (LUNs).

The storage adapter 130 interacts with the storage operating system 200 executing on the storage system to access data requested by the clients 190a,b. The data may be stored on the storage devices 160 The storage adapter includes input/output (I/O) interface circuitry that couples to the storage devices over an I/O interconnect arrangement, such as a conventional Fibre Channel (FC) serial link topology. The data are retrieved by the storage adapter and, if necessary, processed by the processor 110 (or the adapter 130 itself) prior to being forwarded over the system bus 115 to the network adapters 120, 140, where the information is formatted into packets or messages and returned to the clients.

The network adapter 120 couples the storage system 100 to a plurality of clients 190a,b over, e.g., point-to-point links, wide area networks (WANs), virtual private networks (VPNs) implemented over a public network (e.g., the Internet) or shared local area networks (LANs), such as the illustrative Ethernet network 175. The clients 190 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 190 may request the services of the storage system 100 by issuing file access protocol messages (in the form of packets) to the system over the network 175. For example, client 190a executing the Windows operating system may communicate with the storage system 100 using the Common Internet File System (CIFS) protocol over TCP/IP. On the other hand, a client 190b running the UNIX operating system may communicate with the multiprotocol system using either the Network File System (NFS) protocol over TCP/IP or the Direct Access File System (DAFS) protocol over a virtual interface (VI) transport in accordance with a remote direct memory access (RDMA) protocol over TCP/IP. It will be apparent to those skilled in the art that clients running other types of operating systems may also communicate with the integrated multiprotocol storage system using other file access protocols.

The storage network "target" adapter 140 couples the multiprotocol storage system 100 to clients 190 that may be configured to access the stored information as blocks, disks or logical units.

Storage Operating System

Figure 2:
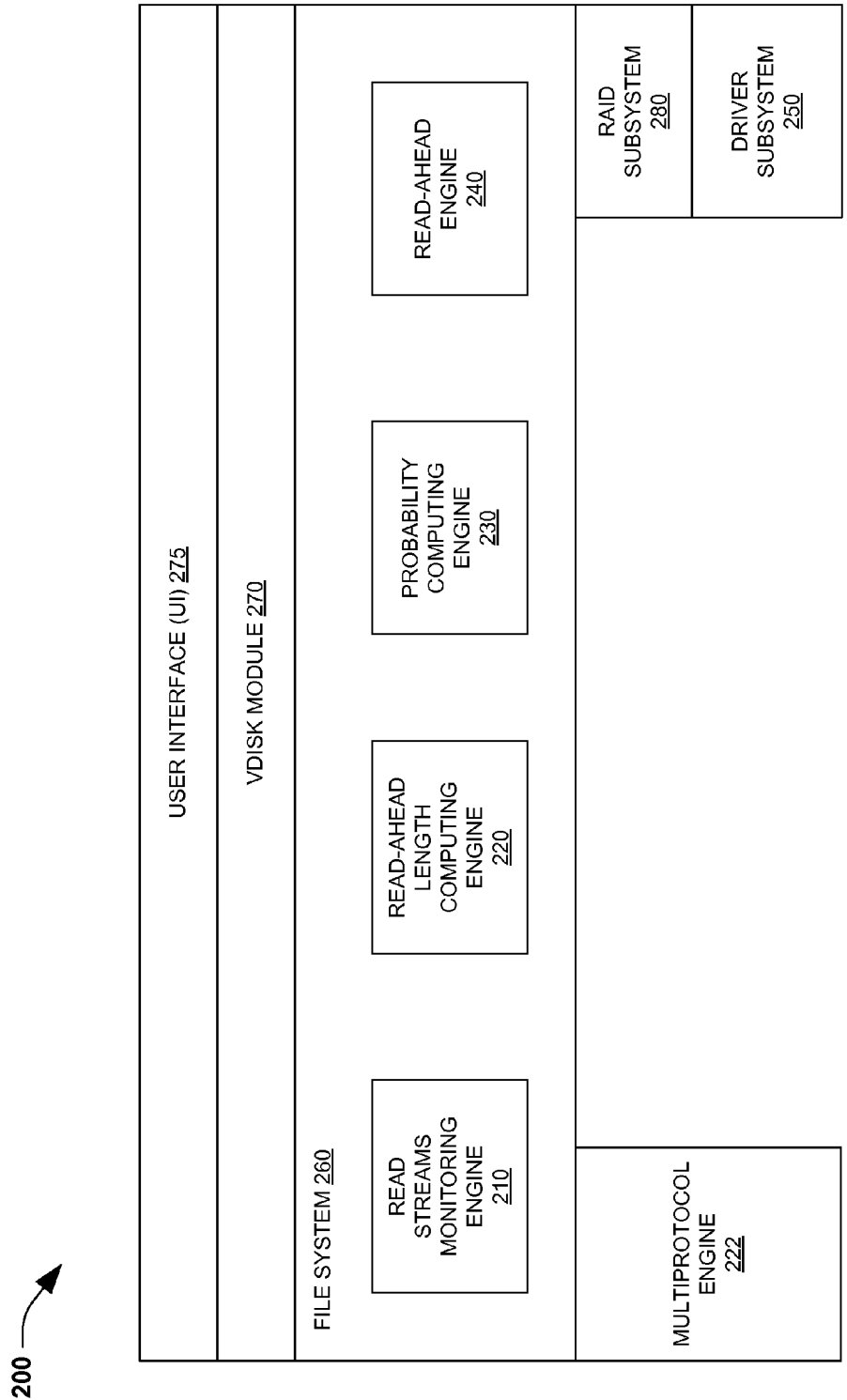
FIG. 2 is a schematic block diagram of an exemplary storage operating system of the storage system illustrated in FIG. 1 that may be advantageously used with the present invention.

FIG. 2 is a schematic block diagram of an exemplary storage operating system 200 that may be advantageously used with the present invention. The storage operating system comprises a series of software layers organized to form an integrated network protocol stack or, more generally, a multiprotocol engine 222 that provides data paths for clients to access information stored on the multiprotocol storage system 100 using block and file access protocols.

In addition, the storage operating system 200 includes a RAID subsystem 280 that may implement a storage protocol, such as a RAID protocol, as well as a driver subsystem 250 for retrieving data blocks from the storage devices 160.

Bridging the subsystems 280 and 250 with the multiprotocol engine 222 is a virtualization system that is implemented by file system 260 interacting with virtualization modules illustratively embodied as, e.g., virtual disk ("vdisk") module 270. The vdisk module 270 is layered on the file system 260 to enable access by administrative interfaces, such as a user interface (UI) 275, in response to a user, such as a system administrator issuing commands to the storage system. The UI 275 is disposed over the storage operating system in a manner that enables administrative or user access to various layers and subsystems, such as the RAID subsystem 280.

The file system 260 is illustratively a message-based system that provides volume management capabilities used to access data stored on the storage devices, such as the storage devices 160. The illustrative file system 260 uses index nodes ("inodes") to identify data containers and store data container attributes (such as creation time, access permissions, size, and block location).

File system 260 further comprises the following components configured to implement novel techniques described herein. These components are include read streams monitoring engine 210, read-ahead length computing engine 220, probability computing engine 230, and read-ahead engine 240.

Engine 210 is configured to monitor read streams received by the storage system and to populate a read streams data structure, such as a histogram, with the entries that reflect behavior of the read streams. An entry in a histogram reflects the count of read streams that have a certain size or fall within a certain size range. Populating the read streams data structure with entries is described in greater detail in reference to FIGS. 5a-5e. The read streams data structure can be implemented as a table, a histogram, or any other structure for holding data. In the illustrated embodiment the data structure storing information about read streams is implemented as a histogram.

In one implementation, engine 220 is configured to determine the expected length of a specific read stream using the histogram populated by engine 210.

Engine 230 is configured to determine probability that a specific read stream achieves the expected size (which might have been determined using known techniques). To this end, engine 230 examines histogram values and determines probability that a selected read stream reaches the expected size.

Engine 240, in turn, is configured to read, into the memory, read ahead data blocks. The address of the read ahead data blocks can be provided by engine 220.

At this point, it is useful to provide a brief description of organization of file system 260, such as a buffer tree, an inode and associated read sets, and a read set data structure. These data structures are later used to describe inventive techniques of determining a length of a read ahead operation.

Figure 3:
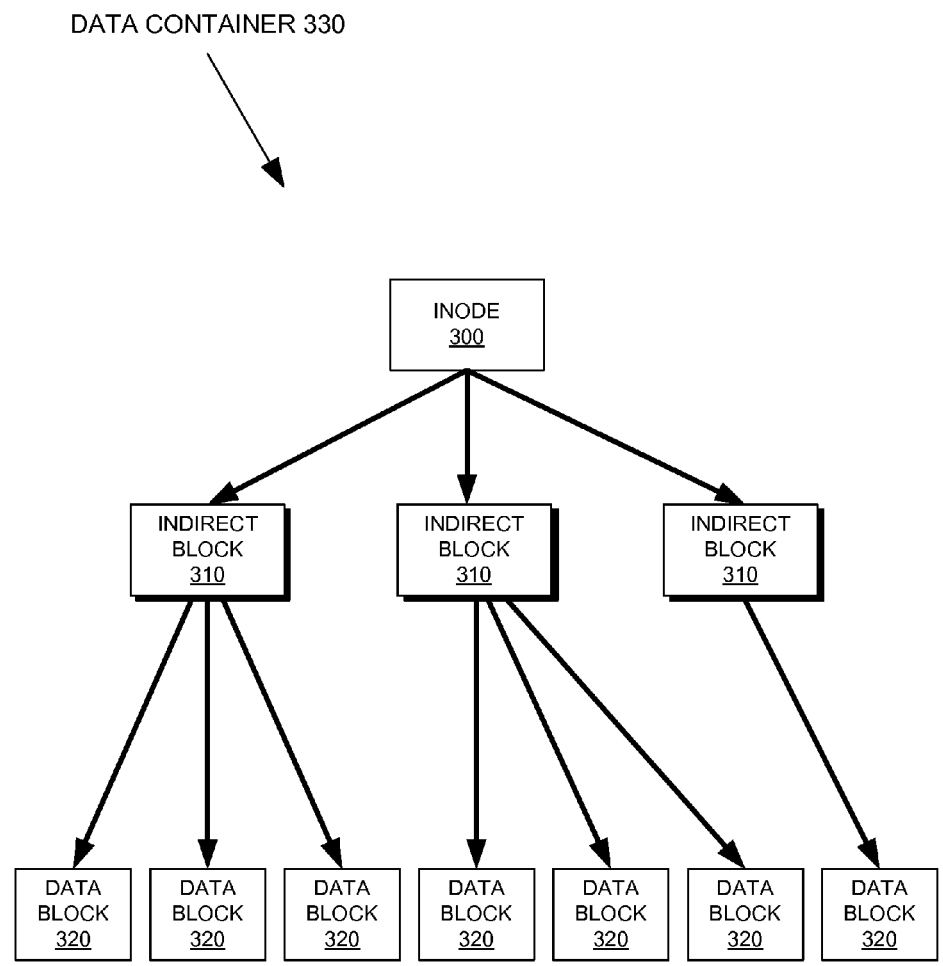
FIG. 3 is a schematic block diagram of an exemplary buffer tree that may be associated with a data container or directory in the illustrative storage system.

FIG. 3 is a schematic block diagram of a buffer tree of data container 330. The buffer tree is an internal representation of blocks of the data container stored in memory. The buffer tree comprises a top-level inode 300 that contains metadata describing the data container 330, and also contains pointers referencing the data blocks 320, e.g., 4 kB data blocks, which store the actual data of the data container. In particular, for a large data container (e.g., greater than 64 kB of data), each pointer in the inode 300 may reference an indirect (level 1) block 310 that contains up to 1024 pointers, each of which can reference a data block 320. By way of example, each pointer in the indirect blocks 310 may store a value identifying a volume block number (vbn) that corresponds to a data block 320 in the file system 260. Operationally, the file system 260 receives a client request, which has been processed by various software layers of the multi-protocol engine 222. For example, a client request received at a network adapter 120 or 140 may be processed by a network driver. The client request is then formatted as a file-system "message" that can be passed to the file system 260. The message may specify, among other things, a client-requested data container or directory (e.g., typically represented by an inode number), a starting offset within the requested data container or directory, and a length of data to write or retrieve following the starting offset. The file system extracts this information from the message and determines whether the data blocks requested by the client are accessible in one or more of the "in-core" buffers. If the requested data blocks are resident in the buffers, the file system retrieves the requested data blocks from memory 150 and processes the retrieved data. However, if the requested data are not resident in the in-core memory 150, the file system 260 generates operations to retrieve the requested data from the storage devices 160 and places the data in memory. The file system passes a message structure identifying the vbn numbers assigned to the client-requested data blocks to the RAID subsystem 280, which maps the vbns to corresponding disk block numbers (dbn). The file system then sends the latter to an appropriate driver (e.g., SCSI) of the driver subsystem 250. The driver subsystem accesses the requested dbns from the storage devices 160 and loads the requested data block(s) in memory 150 for processing by the file system 260.

As will be described in greater detail in reference to FIG. 6, in addition to retrieving data blocks containing the client-requested data, the file system 260 may also instruct subsystems 280 and 250 to retrieve additional "read-ahead" data blocks from the storage device 160. These read-ahead data blocks may correspond to a range of data blocks (e.g., fbns) that further extend the sequence of the data blocks, even though the read-ahead blocks have not yet been requested by the client.

Similarly to the client-requested data blocks, the read-ahead data blocks can be retrieved by e.g., subsystems 280 and 250 and copied into memory buffers (e.g., memory buffers 1200 shown in FIG. 1) accessible to the file system 260. Such memory buffers may be obtained from the buffer cache 156. The file system may access (through a read or write operation) the client-requested data in the retrieved data blocks in accordance with the client's request, and, when appropriate, return the requested data and/or an acknowledgement message back to the requesting client 190.

Read Sets

In accordance with the known technique, which was described in a commonly-owned patent application Ser. No. 10/721,596, entitled ADAPTIVE FILE READ-AHEAD TECHNIQUE FOR MULTIPLE READ STREAMS, by Robert L. Fair, the teachings of which are expressly incorporated herein by reference, the storage operating system 200 maintains a separate set of read-ahead metadata for each of a plurality of concurrently managed read streams. In one implementation, the operating system also stores metadata for each read stream in a separate "read set" data structure such that one read set stores metadata for one read stream. A data container or directory supporting multiple read streams may be associated with a plurality of different read sets. The description of read sets is provided below for background purposes.

Figure 4A:
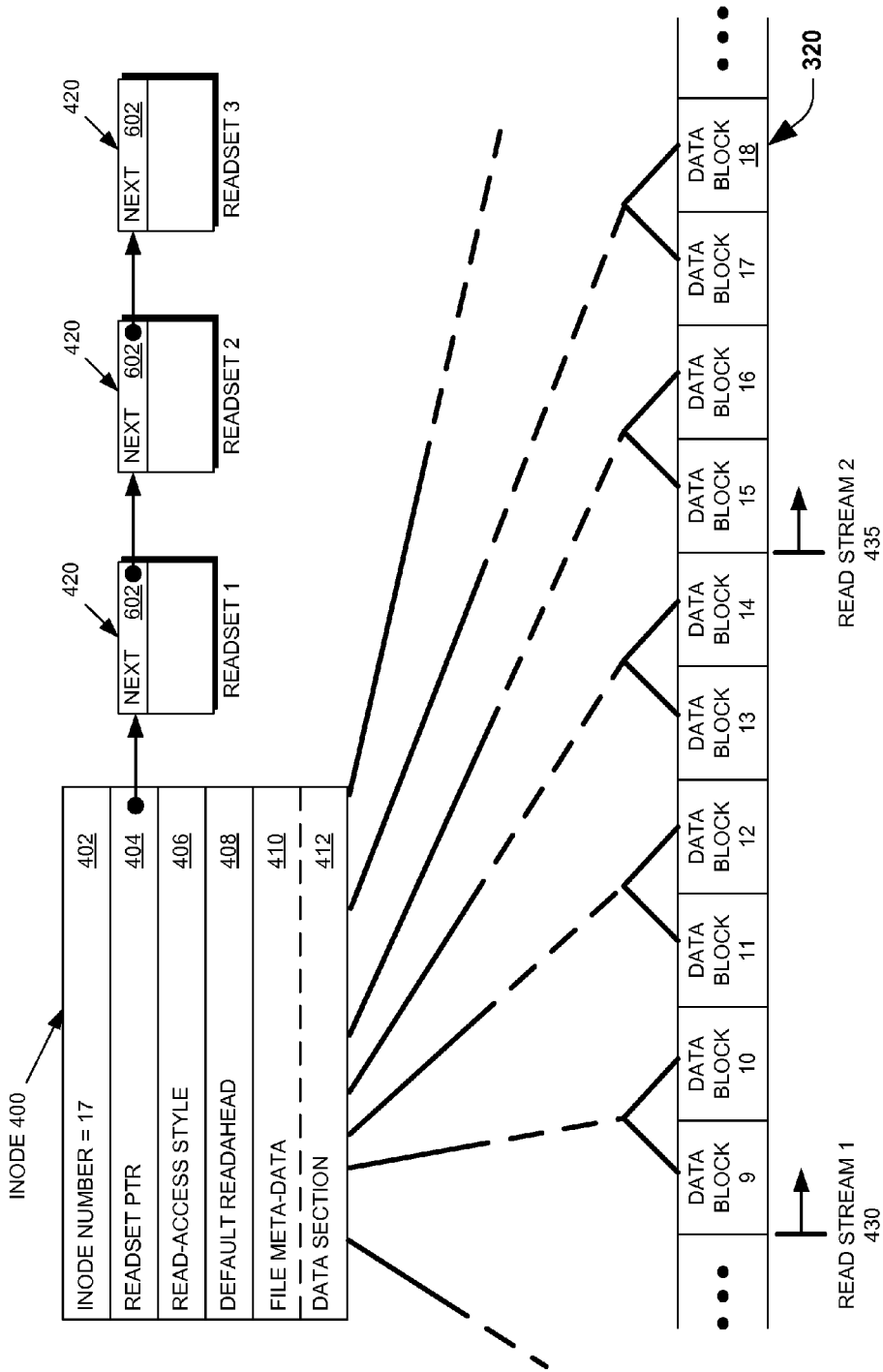
FIG. 4A is a schematic block diagram of an inode and an exemplary set of read set data structures that may be used to store read-ahead metadata for read streams established in the inode's associated file or directory.

FIG. 4A illustrates an exemplary inode 400 and its associated set of read sets 420a-c. The inode 400 comprises, inter alia, an inode number (or other identifier) 402, a read set pointer 404, a read-access style 406, a default read-ahead value 408, file metadata 410 and a data section 412. The inode 400 may be dynamically allocated or obtained from the inode pool 154 in response to the storage operating system 200 receiving a client request to access data in the inode. The inode number 402, e.g., which equals 17 in this example, may be used to uniquely identify the file or directory associated with the inode 400. For instance, the client request may specify an inode number whose associated file or directory contains a particular range of data that the client desires to access. The client-specified inode number may be coupled with an indication of a starting offset in the file and a length of data to access beginning at the starting offset.

The read set pointer 404 stores a value that indicates the memory location of read sets 420 a-c. In operation, the file system 260 may dynamically allocate the read sets or acquire previously allocated read sets from a read set pool 152. Each read set allocated for the inode 400 may be initialized to store a predetermined set of values. Illustratively, the read sets 420a-c associated with the inode 400 are arranged as a linked list, wherein each read set comprises a "next" pointer 602 that stores a value indicating the memory location of a next read set in the list. The next pointer in the list' last read set, e.g., read set 420c, may store a predetermined "null" value to indicate that it is at the end of the list. While read sets in the illustrative embodiment are arranged as a linked list, those skilled in the art will appreciate that the read sets may be arranged in other configurations, such as a search tree.

The read-access style 406 stores a value indicating a read-access pattern that describes the manner by which data is read from the file or directory associated with the inode 400. For instance, the read-access style may indicate that data in the inode's file or directory will be read according to, e.g., a normal, sequential or random access pattern. The storage operating system 200 may dynamically identify and update the read-access pattern value 406 as it processes client read requests. The default read-ahead value 408 indicates a predetermined number of data blocks that may be prefetched (i.e., read in advance) in anticipation of future client read requests for data stored in the inode 400's associated file or directory.

The metadata field 410 stores other metadata information related to the data container or directory associated with the inode 400. Such metadata information may include, inter alia, security credentials, such as user identifiers and group identifiers, access control lists, flags, pointers to other data structures, and so forth. The inode 400 also includes a data section 412 including a set of pointers that (directly or indirectly) reference the memory locations of the data blocks 320 containing the inode's associated file or directory. In this example, the pointers in the data section 412 reference one or more indirect blocks (not shown), which in turn contain pointers that reference the memory locations of a set of contiguous data blocks containing the file or directory. Hereinafter, it is assumed that each of the data blocks accessible from the inode 400 is assigned a corresponding fbn and the data container (or directory) associated with the inode 400 comprises a set of data blocks which are assigned consecutive fbn values. Advantageously, multiple read streams may be concurrently established among the data blocks 320 containing the inode 400's file or directory. As shown, for example, two concurrent read streams 430 and 435 are identified in the set of data blocks 9 through 18. The read stream 430 corresponds to a logically contiguous sequence of fbns retrieved by the file system 260 up to, but not including, the file block number 9. Similarly, the read stream 435 corresponds to a logically contiguous sequence of fbns retrieved up to, but not including, the file block number 15. In accordance with the illustrative embodiment, each of these read streams may be associated with a respective set of read-ahead metadata stored in a different one of the read sets 420a-c.

As noted, each read set is configured to store metadata associated with a corresponding read stream. Therefore, because the illustrative inode 400 is associated with three read sets 420a-c, the inode's associated file or directory can support up to three different read streams. However, it is expressly contemplated that the inode may be associated with an arbitrary number of read sets 420.

FIG. 4B illustrates an exemplary read set 420 which may be accessed via the read set pointer 902. The description of the read sets is provided in part in order to explain where start and end address of a read stream are maintained. Those skilled in the art would understand that the start and end address of a read stream can be maintained in any other structure. The read set contains metadata associated with a corresponding read stream. The read set 420 may comprise, inter alia, a next pointer 902, a level value 904, a count value 906, a last read offset value 908, a last read size 910, a next read-ahead value 912, a read-ahead size 914 and various flags 916. Those skilled in the art will understand that the read set 420 also may be configured to store other information. The next read-ahead value 912 stores an indication of a predefined data container offset or memory address where the file system 260 will perform its next set of read-ahead operations for the read stream associated with the read set 920. The read-ahead size value 914 stores the number of read-ahead data blocks that are prefetched. Having retrieved the read-ahead data blocks, the file system 260 may update the next read-ahead value 912 to indicate the next file offset or memory address where read-ahead operations will be performed for the read stream. After the read-ahead data blocks are retrieved, they are copied into in-core memory buffers in the memory 150 and the file system finishes processing the client read request. Last Read Offset 908 stores the last offset for the I/O. Thus, suppose a read stream reads block number 1, 2, 3, and 4 in one read operation, and then some time later, it reads blocks 5, 6, 7, and 8, then the last offset for I/O is block 8. Each read set 420 may optionally include one or more flag values 914 that enable the file system 260 to specialize read-ahead operations for the read set associated read stream. For instance, one of the flag values may indicate in which "direction" the file system should speculatively retrieve data blocks for the read stream. That is, the file system may be configured to retrieve data blocks in a logical "forward" direction (i.e., in order of increasing data block numbers) or in a logical "backward" direction (i.e., in order of decreasing data block numbers). Other flag values 914 may indicate whether the read-ahead data blocks contain "read-once" data and therefore should not be stored in the memory 150 for a prolonged period of time.

Read Stream Monitoring and Determining Expected Read-Ahead Length

Embodiments described herein provide novel techniques for optimizing the amount of data that need to be read ahead in a storage system in order to serve future client requests. The novel optimized technique monitors behavior of client read requests to a storage system and uses the previous read requests to predict the system's performance with respect to the future read requests. The novel technique uses a data structure, such as a histogram, to maintain information about read streams. The novel technique also employs probabilistic analysis to determine whether a selected read stream will achieve the expected size, which might have been computed using known techniques. This analysis is based on the monitored behavior of the previous read requests.

Figure 5A:
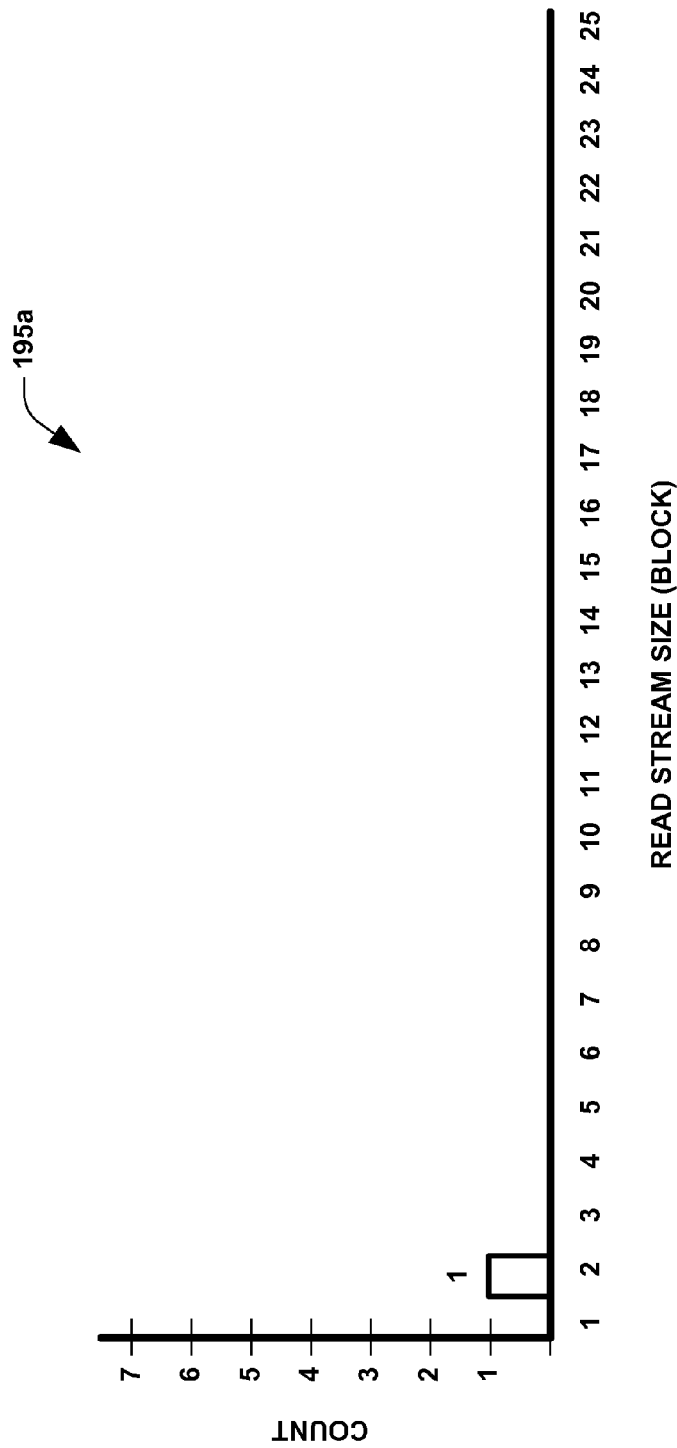
FIGS. 5a-5e represent different states of a histogram reflecting a size of a received read stream and a count of read streams having a certain size.
Figure 5B:
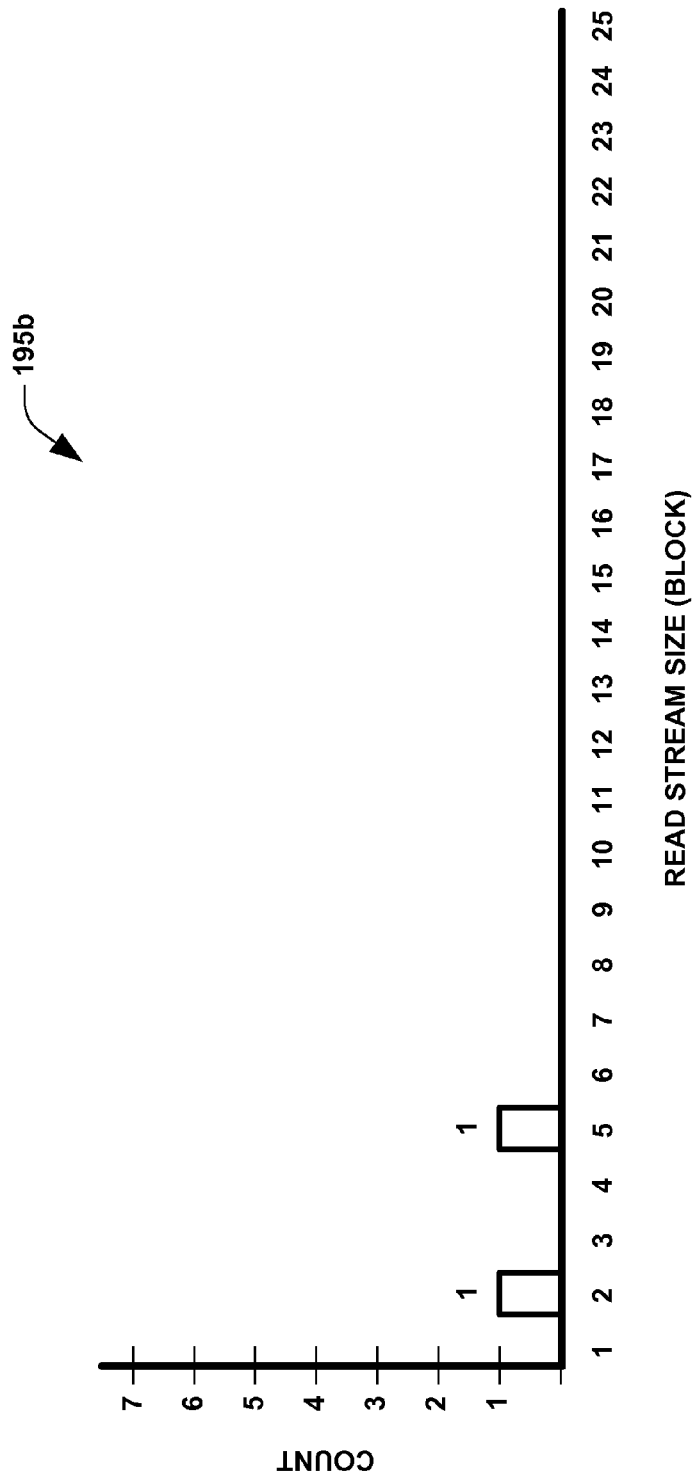
Figure 5C:
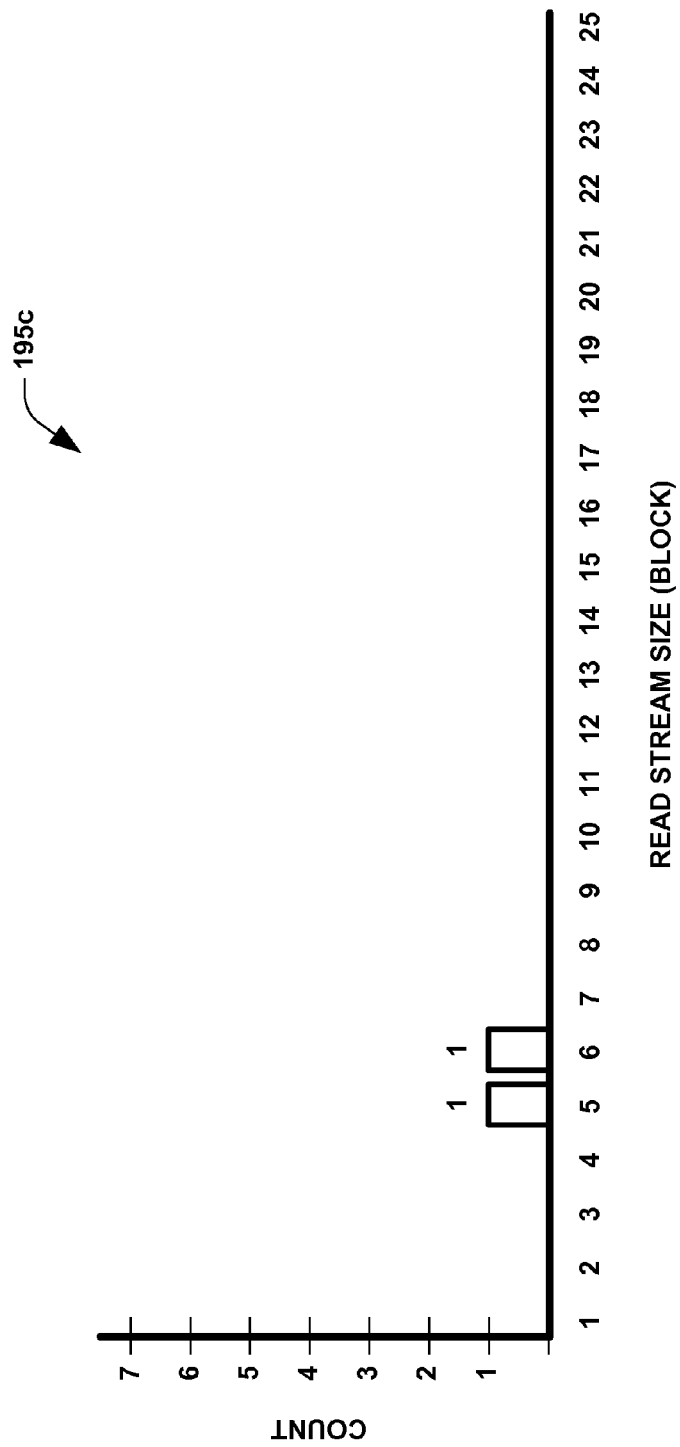
Figure 5D:
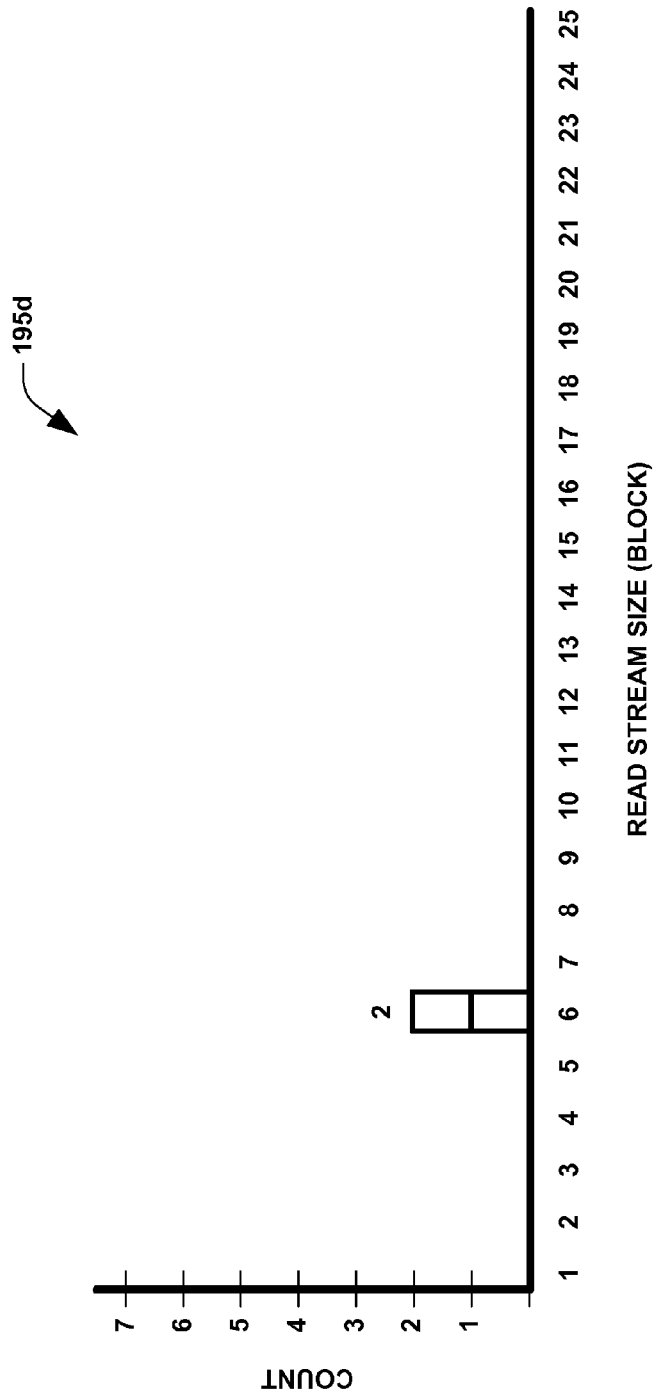
Figure 5E:
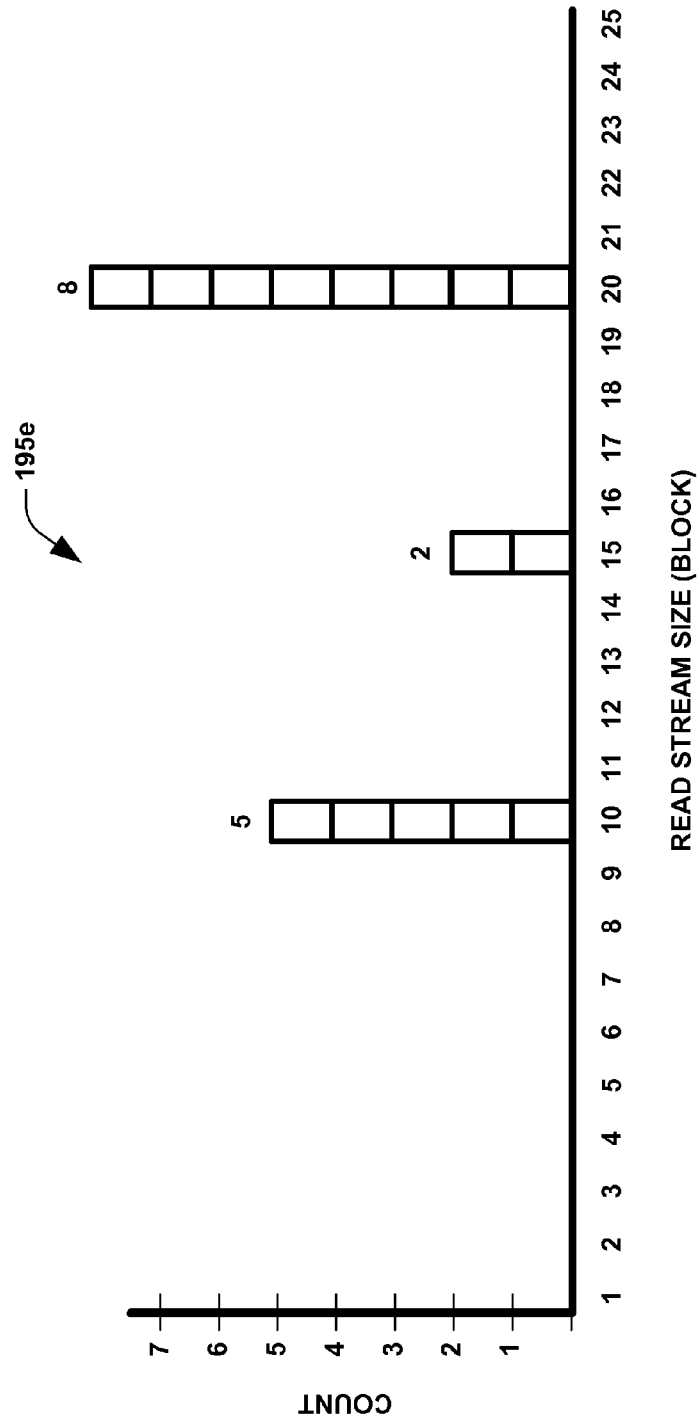
Figure 6:
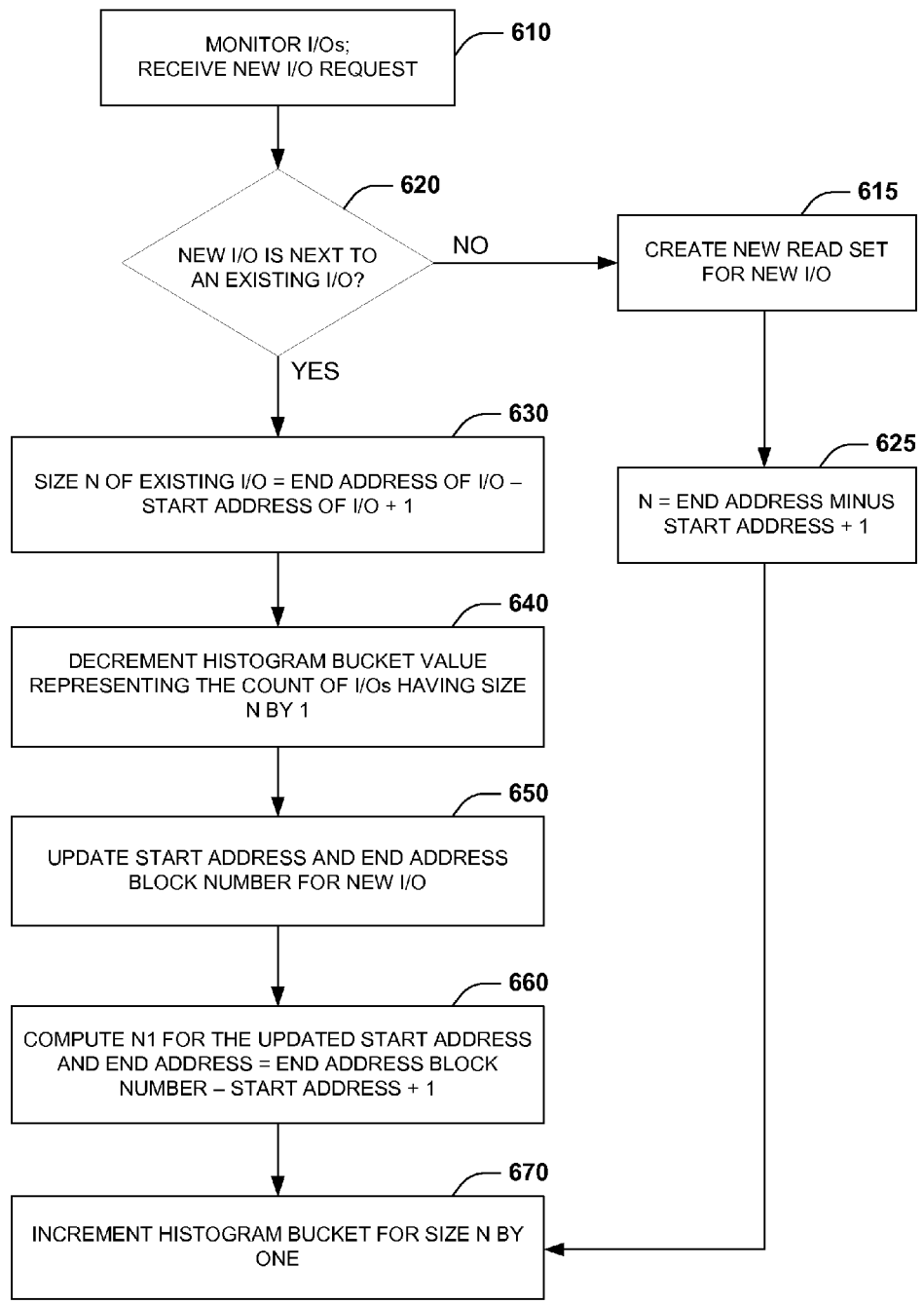
FIG. 6 is a flow diagram illustrating a sequence of steps performed by the storage system to monitor received read streams.

Referring now to FIG. 6, a flowchart summarizing a sequence of steps to determine expected read-ahead length of a selected stream is illustrated. Initially, at step 610, engine 210 monitors the received I/Os and populates a histogram 195 illustrated in FIGS. 5*a*-5*e*). When storage system 100 is first booted, the data structure does not have any entries. This indicates that there are no read streams yet.

As a new read request arrives, engine 210 examines the existing read sets (such as the ones illustrated in FIGS. 4A and 4B) to determine if the new read operation is related to any previous read operation that has taken place (step 620). In one implementation, to this end, engine 210 examines the starting location of the read operation and compares it to the ending location of each read stream as it is recorded in its read set (as shown in FIG. 4B) If the starting address (location) of the new read request is within a close proximity to the value stored in the Last Read Offset field (as shown in FIG. 4B, as Last Read Offset 908), engine 210 determines that the current read operation is part of the existing read steam. The end block address is the sum of the value in the Last Read Offset 908 and the value in the Last Read Size 910 (shown in FIG. 4B). The close proximity can be defined, for example, as being within one to five data blocks from the location where the previous read stream ended. Those skilled in the art would appreciate though that the close proximity may be defined by other parameters.

If the determination is positive in step 620, size N of any previous I/O is determined (step 630). Size N is equal to the difference between the end block address of the previous I/O and the start block address of the previous I/O less one. Engine 210 decrements by one a histogram value representing the count of I/Os having length N (step 640) since the new I/O is part of the existing I/O (as determined by the close proximity of the end/start address).

Since the two I/Os are combined, at step 650, the start address and end address of the new I/O is updated to reflect the start or end address of the previous I/O. Upon updating the start/end address of the new I/O, the N1 length of the new I/O is recomputed (step 660) to represent a difference between the updated end address and updated start address incremented by one. Now the histogram count for the recomputed N length can be increased by one (an example illustrating population of the histogram is described below in reference to FIGS. 5*a*-5*e*).

If the determination in step 620 earlier is negative (which essentially means that the new I/O is not within close proximity of any existing I/O and thus is not part of the existing I/O), a new read set for the new I/O is created (such as indicated in FIG. 4A) and stored in memory (step 615). Then, length N is computed as equal to the difference between the end address of the new I/O and start address of the new I/O incremented by one (step 625). The histogram value for the computed N size is incremented by one (step 670).

To illustrate the above steps, the following example is chosen. Suppose that a client accesses storage system 100 to read two blocks of data and that the location it reads from is block number 47 within a LUN. The storage system identifies an available read set data structure (read set) from the pool of read sets and populates the histogram to indicate that there is now one read stream that has read two blocks (see FIG. 5*a*).

The next read to occur might be by the same client or by a different client, which reads five blocks from a different location, say, from block 192. The storage system examines the existing read set(s) to determine if the new read operation is related to any previous read operations that have taken place. To this end, the read stream monitoring engine compares the new read stream at block 192 and the existing read streams which read blocks 47 and 48. Since block numbers 47 and 48 are not within close proximity to block 192, these two read streams are not related. As shown in FIG. 5*b*, data structure 195*b* is updated to indicate that there are two read streams that have been received—one has read two blocks and the other has read five blocks.

Suppose that another client read operation arrives. This operation reads four blocks starting at location 49. Engine 210 examines the starting location of the read operation and compares it against the ending location of each read stream as it is recorded in its respective read set. Block 49 is next to where the first read stream ended (block 48). The read stream monitoring engine 210 determines that the current read operation is part of the first stream. The read stream monitoring engine 210 updates the histogram 195*c* by decrementing the old entry for this stream. Engine 210 also updates the stream length to 2+4=6 blocks, as shown in FIG. 5*c*. The histogram 195*c* now reflects that one read stream has read a total of six blocks and a second read stream has read a total of five blocks.

The next client read operation reads a single block from block 197. The read stream monitoring engine 210 determines if this read operation is related to any of the previously monitored read streams. Engine 210 determines that this read operation is related to the second read stream since block 197 is within close proximity to the previously read block 192. Thus, it is part of the same read stream. The new size of this read stream is determined to be 5+1=6. Now the two streams have the same size, 6 data blocks. Because the read operations take place at different locations, they are maintained as separate read streams, but they are merged in the histogram 195*d* because they are now of the same size (see FIG. 5*d*).

As more read requests arrive, some related to existing streams and some not, the histogram gradually builds up a history of behavior of read streams. At some point, there could be 15 total streams represented by 15 separate read sets, as shown in FIG. 5*e*. The inventive technique assumes that the behavior of the clients issuing I/Os with respect to the existing read streams is indicative of the client behavior in the near future. Therefore, the statistics collected in the histogram can be used to make better decisions as to how much data should be read ahead by the storage system, as will be described in connection with a flow diagram illustrated in FIG. 7.

Figure 7:
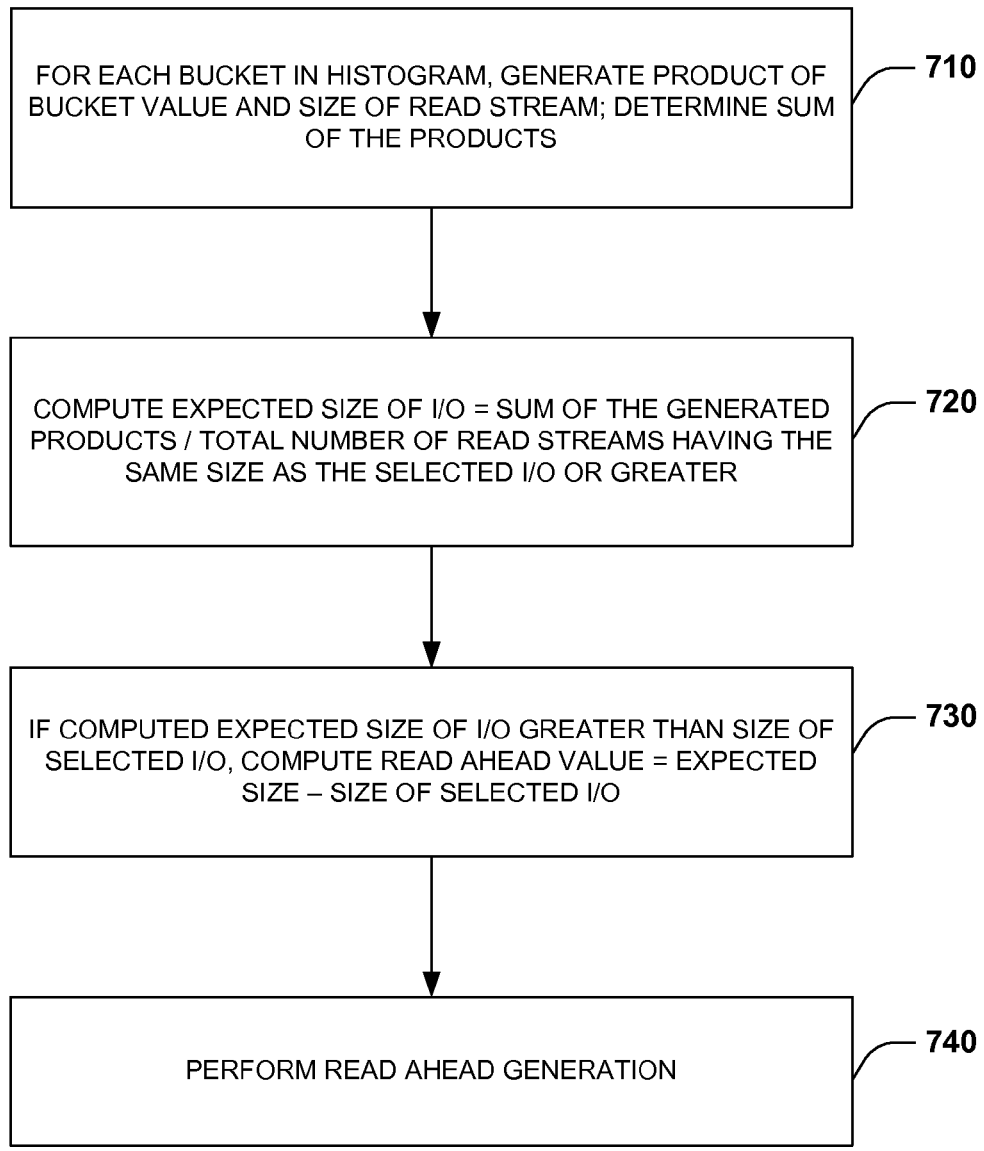
FIG. 7 is a flow diagram illustrating a sequence of steps performed by the storage system to determine read-ahead size of a selected read stream according to one embodiment of the invention.

FIG. 7 is a flow diagram illustrating steps to determine expected size of a selected read stream using the computed histogram. The expected size of the selected read stream will be used to determine the read-ahead size of the selected read stream. The read-ahead size of the read stream is the expected size of the read stream less the actual size of the read stream. The actual length of the read stream reflects a number of sequential data blocks that has been read by the I/O.

In one implementation, the expected size of the read stream is determined as a weighted average. At step 710, for each bucket in the histogram, where the bucket represents a count of read streams having a particular size N, engine 220 generates a product of a count of read streams having a size N and a size of the read stream. Then engine 220 accumulates the products. For example, in FIG. 5*e*, five streams have each read 10 blocks, two streams have each read 15 blocks and 8 streams have each read 20 blocks. The accumulated product is generated as follows: (5×10+2×15+8×20)=240.

At step 720, engine 220 determines expected size of a selected read stream. The selected read stream can be chosen based on various characteristics. For example, the I/O can be selected because it is the most recently used. The expected size of the selected I/O, as determined by engine 220, is the result of the product of the sum computed in step 720 and an inversion factor of a count of read streams having the same size as the selected read stream or greater. The resultant number is the expected size of the selected I/O. Those skilled in the art would understand that the read streams having the same size as the selected read stream or greater can be selected based on other criteria. For example, reads streams from the same volume (or other storage container) having sizes equal to or greater than the selected read stream can be chosen. As a result, multiple histograms will be built to monitor read requests rather than having one histogram for the system.

Consider the following example. The selected read stream has a size of 10 data blocks. Referring to the example shown in FIG. 5*e*, the total number of read streams having the size equal to or greater than 10 is 15. Continuing with the same example, the expected size of the selected read stream is 240/15=16. Thus, the expected size of the selected read stream having size 10 is 16. In other embodiments, the expected size of the selected read stream can be determined by using the next highest populated field in the histogram. For example, in FIG. 5*e*, if the system has already read 11 blocks, then based on the histogram values shown in FIG. 5*e*, the next highest populated value is 15 (reflecting that 2 read streams have read 15 data blocks).

At step 730, if the expected size of the read stream is greater than the actual size of the selected read stream, engine 220 determines read ahead size as a difference between the expected size and the actual size of the read stream. For example, if the expected size is 16, engine 220 determines the read ahead size of the read stream as the difference between 16 and 10 data blocks, which is 6.

At step 740, read-ahead engine 240 speculatively reads the read-ahead size of the stream, which is the difference between the expected length and the actual length N of the I/O. In one implementation, read-ahead engine 240 retrieves read ahead data blocks from the storage device and stores them in memory, such as buffer cache 154 (shown in FIG. 1). The read-ahead blocks preferably logically extend the read stream. Furthermore, the read set data structure (shown in FIG. 4A) corresponding to the read stream is updated to reflect a number of speculatively read data blocks.

Figure 8:
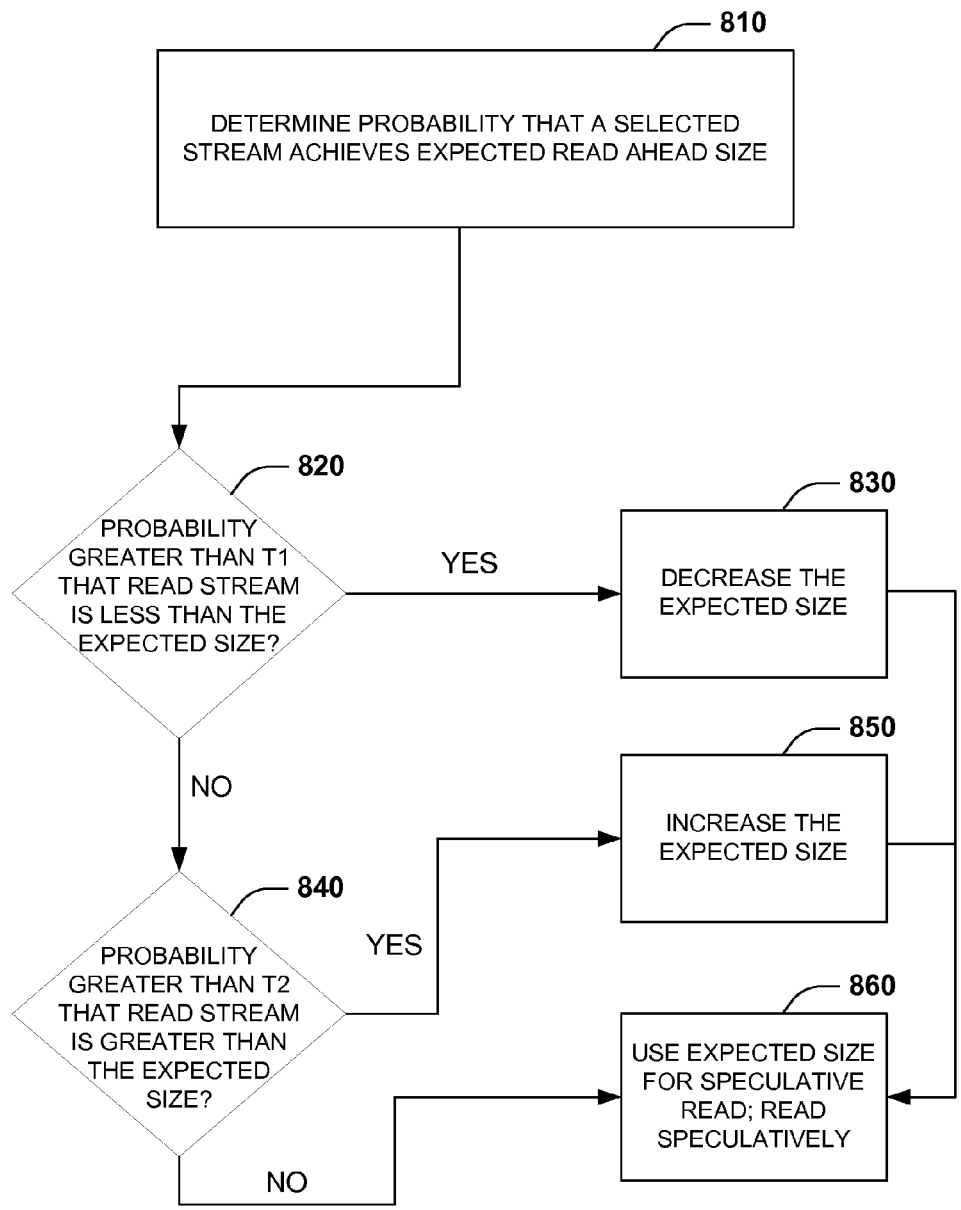
FIG. 8 is a flow diagram illustrating a sequence of steps to determine probability that a selected stream achieves expected size.

According to another embodiment (as illustrated in a flow diagram in FIG. 8), the computed histogram values can be used to correct the results of the existing read-ahead algorithms. For example, a known algorithm was used to compute a read-ahead size of a selected read stream. One such algorithm is described in the U.S. Pat. No. 7,631,148 assigned to NetApp, Inc., entitled ADAPTIVE FILE READ-AHEAD TECHNIQUE FOR MULTIPLE READ STREAMS, by Robert L. Fair, the teachings of which are expressly incorporated herein by reference. However, the method described in U.S. Pat. No. 7,631,148 can potentially overshoot or undershoot (which essentially means that too many or too few data blocks are read into memory in anticipation of the client read request).

Thus, according to the novel embodiment described herein, the data collected in the histogram can be used to improve predictions of the existing read-ahead methods. To determine if the computed read ahead size N will result in undershooting, the probability p1 that the selected stream would ultimately read N or fewer additional blocks is determined by the probability computing engine 230. If p1 is below a given threshold (provided by a system administrator, for example, and stored in the storage system memory), it is likely the storage system will read too few blocks. To determine if the computed read-ahead length N will result in overshooting, the probability p2 that the selected stream would ultimately read N or more blocks is determined. If p2 is below a given threshold, it is likely that the storage system will read too many blocks.

Engine 230 uses the computed histogram and the expected size of a selected read stream to determine probability if the selected read stream will be greater or less than its expected size prior to being abandoned (step 810). Abandoning a read stream means reusing the same read set for a new read stream so that the abandoned read stream is not used for purposes of statistical analysis. To determine probability of a condition (such a condition can be that a read stream is greater than a certain size, for example), engine 230 determines a product of the count of the number of read streams that meet the condition (being greater in size than a certain value) and an inverse factor of the total population of read streams.

To determine the total number of read streams, probability computing engine 230 goes through the entries in the histogram shown in FIGS. 5*a*-5*c* and adds the count of read streams of each size. As shown in FIG. 5*e*, the total population of read streams is 15. The number of read streams smaller than size 10 is zero; so the probability that a stream will be smaller than 10 is also zero. Thus, engine 230 uses histogram 195 to determine the number of streams that meet the condition and multiplies it by the inverse factor of the total number of streams. To determine the total number of streams, engine 230 iterates through the entire histogram and adds up the count of streams of each size. To find the count of streams below or above a certain size, engine 230 starts at that size and counts the number of streams below it or it starts at the beginning and counts up to that size. The probability that a stream is of a certain size is a result of the product of the count of streams of that size and an inverse factor of the total population of the read streams.

Now consider the following example. If a specific stream has already read 15 blocks and another technique determined that a read-ahead size should be six more data blocks, it results in the expected size of 21 of the read stream. The probability that the storage system overshoots at 21 blocks is 100% because none of the read streams have achieved this length. In contrast, the probability that the storage system undershoots at 21 blocks is zero.

Considering another example, if the selected stream has already read 15 blocks and a read-ahead size is determined to be 2 blocks, the expected length of the read stream is 17. The probability that the storage system overshoots or undershoots at 17 is determined as follows. The total number of streams of length 15 or greater is ten. The number of streams that have read more than 17 blocks is eight; so the probability that storage system undershoots at 17 is 8/10=80%. The number of streams that have read at least 15 data blocks but less than 17 data blocks is two, so the probability that the storage system overshoots at 17 is 2/10=20%.

At step 820, engine 230 compares the computed probability to a threshold value T1 (such as a value stored in the memory of the storage system and selected by a user administrator of the storage system). If the computed probability that the selected read stream size will ultimately be less than the expected length exceeds a threshold value T1, it is likely that the storage system will read too many blocks than the client might request. Thus, to correct this problem, the expected length is decreased downwards (step 830). In one implementation, the size of the expected length, for example, can be divided by a factor selected by a system administrator and provided to the storage system. This process can be performed iteratively until the threshold T1 is not exceeded. If the probability that the read stream size will ultimately be greater than the expected length exceeds the threshold T2 (step 840), it is likely that the storage system will read too few blocks and thus undershoots. To correct this problem, the given length is increased upwards (step 850). The size of the expected length can be, for example, multiplied by a factor. Those skilled in the art should understand that in one embodiment T1 and T2 values in steps 820 and 840 could be the same. While in other implementations, T1 and T2 can be different.

Thus, using the past behavior of client read requests and computing the probabilities that a specific read stream will achieve a certain expected size allows the storage system to make a better prediction with respect to a size of a read ahead operation. This, in turn, reduces the undesirable implications of reading ahead by the storage system too many or too few data blocks.

If neither threshold T1 or T2 is exceeded, then the expected length is used for speculatively reading the data blocks (step 860).

It should be noted that the threshold T1 and T2 can be adjusted based on various factors, such as the buffer cache size, the workload of the storage system and the prior use of read-ahead data. From the standpoint of the buffer cache size, the risk of reading too much data is taking up extra space by the buffer cache. Using that extra space might cause other data to be evicted from the buffer cache. That "other data" might be more valuable to the clients than the data prefetched by the clients but never required by a client. If the buffer cache size were to change dynamically though (e.g., growing and shrinking in response to competing demands for memory while the storage system is running), then the storage system has more flexibility to use more buffer cache space even if the probability of using prefetched data is lower. Thus, in situations when the buffer cache size can change dynamically, the threshold T1 and T2 can be changed to a lower number.

Similarly, read-ahead engine 240 may analyze the usage by prior use of the previously read-ahead data. If in the past 90% of the read-ahead data were not used by clients, the threshold could be moved upwards to have more certainty that the read-ahead data will be used prior to increasing the expected size. Read-ahead engine 240 then speculatively reads the read-ahead length of the stream, which is the difference between the expected length and the current length of the specific read stream.

The techniques introduced above can be implemented by programmable circuitry that is configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc. Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for managing an amount of read-ahead data, comprising:
   monitoring client read operations, a client read operation requesting data blocks representing a read stream;
   populating a data structure with read stream sizes and read stream counts based upon the client read operations;
   evaluating the data structure to select a first read stream having a first read stream size;
   evaluating the data structure to identify a set of read streams, where read streams within the set of read streams have read stream sizes equal to or greater than the first read stream size;
   generating a stream metric corresponding to the read stream sizes and a count of the read streams within the set of read streams;
   determining an expected size of a target read stream based upon the stream metric, the determining comprising:

determining a probability that the first read stream corresponds to the expected size; and
adjusting the expected size, comprising:
responsive to the probability exceeding a first threshold, decreasing the expected size; and
responsive to the probability exceeding a second threshold, increasing the expected size; and
reading ahead a number of data blocks corresponding to a difference between the first read stream size and the expected size after the adjusting.

2. The method of claim 1, the first threshold indicative of the first read stream size being less than the expected size.

3. The method of claim 1, the second threshold indicative of the first read stream size being greater than the expected size.

4. The method of claim 1, the determining an expected size comprising:
using the data structure to determine a next highest populated read stream field in the data structure.

5. The method of claim 1, the data structure corresponding to a storage container of a storage system.

6. The method of claim 1, the populating the data structure comprising:
responsive to a new read stream being within a proximity to an existing read stream, updating at least one of a start address or an end address of the new read stream for incrementing the data structure according to a size of the new read stream.

7. The method of claim 1, the populating the data structure comprising:
responsive to a new read stream not being within a proximity to an existing read stream, creating a new read set of the new read stream.

8. The method of claim 1, the first read stream being a most recently used stream by a client.

9. The method of claim 1, the set of read streams not comprising a most recently used stream by a client.

10. A system for managing an amount of read-ahead data, comprising:
one or more processors; and
memory comprising instructions that when executed by at least one of the one or more processors implement at least some of:
a read streams monitoring engine configured to:
monitor client read operations, a client read operation requesting data blocks representing a read stream; and
populate a data structure with read stream sizes and read stream counts based upon the client read operations;
a read-ahead length computing engine configured to:
evaluate the data structure to select a first read stream having a first read stream size;
evaluate the data structure to identify a set of read streams, where read streams within the set of read streams have read stream sizes equal to or greater than the first read stream size;
generate a stream metric corresponding to the read stream sizes and a count of the read streams within the set of read streams; and
determine an expected size of a target read stream based upon the stream metric, the determining comprising:
determining a probability that the first read stream corresponds to the expected size; and
adjusting the expected size, comprising:
responsive to the probability exceeding a first threshold, decreasing the expected size; and
responsive to the probability exceeding a second threshold, increasing the expected size; and
a read-ahead engine configured to:
read ahead a number of data blocks corresponding to a difference between the first read stream size and the expected size after the adjusting.

11. The system of claim 10, the first threshold indicative of the first read stream size being less than the expected size.

12. The system of claim 10, the second threshold indicative of the first read stream size being greater than the expected size.

13. A computer-readable medium comprising instructions which when executed at least in part via a processor perform a method for managing an amount of read-ahead data, comprising:
monitoring client read operations, a client read operation requesting data blocks representing a read stream;
populating a data structure with read stream sizes and read stream counts based upon the client read operations;
evaluating the data structure to select a first read stream having a first read stream size;
evaluating the data structure to identify a set of read streams, where read streams within the set of read streams have read stream sizes equal to or greater than the first read stream size;
generating a stream metric corresponding to the read stream sizes and a count of the read streams within the set of read streams;
determining an expected size of a target read stream based upon the stream metric, the determining comprising:
determining a probability that the first read stream corresponds to the expected size; and
adjusting the expected size, comprising:
responsive to the probability exceeding a first threshold, decreasing the expected size; and
responsive to the probability exceeding a second threshold, increasing the expected size; and
reading ahead a number of data blocks corresponding to a difference between the first read stream size and the expected size after the adjusting.

14. The computer-readable medium of claim 13, the first threshold indicative of the first read stream size being less than the expected size.

15. The computer-readable medium of claim 13, the second threshold indicative of the first read stream size being greater than the expected size.

16. The computer-readable medium of claim 13, the determining an expected size comprising:
using the data structure to determine a next highest populated read stream field in the data structure.

17. The computer-readable medium of claim 13, the data structure corresponding to a storage container of a storage system.

18. A method for managing an amount of read-ahead data, comprising:
monitoring client read operations, a client read operation requesting data blocks representing a read stream;
populating a data structure with read stream sizes and read stream counts based upon the client read operations;
evaluating the data structure to select a first read stream having a first read stream size;
evaluating the data structure to identify a set of read streams, where read streams within the set of read streams have read stream sizes equal to or greater than the first read stream size;

generating a stream metric corresponding to the read stream sizes and a count of the read streams within the set of read streams;
determining an expected size of a target read stream based upon the stream metric, the determining comprising:
　determining a probability that the first read stream corresponds to the expected size; and
　adjusting the expected size, comprising:
　　responsive to the probability exceeding a first threshold indicative of the first read stream size being less than the expected size, decreasing the expected size; and
　　responsive to the probability exceeding a second threshold indicative of the first read stream size being greater than the expected size, increasing the expected size; and
reading ahead a number of data blocks corresponding to a difference between the first read stream size and the expected size after the adjusting.

* * * * *